Feb. 12, 1924.
W. G. STRUTHERS
SHOCK ABSORBER
Filed Nov. 20, 1922
1,483,693
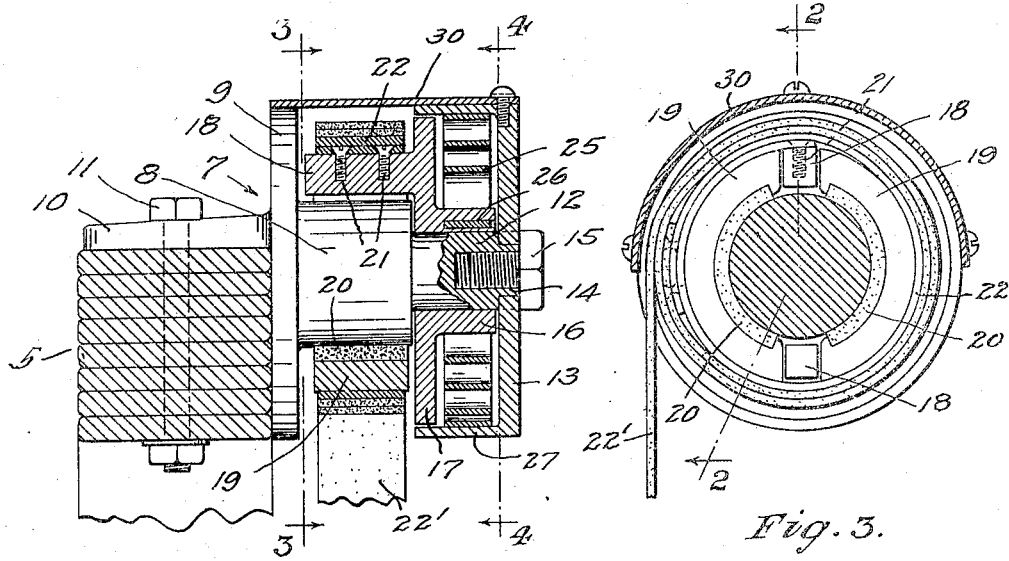
Fig. 2.
Fig. 3.
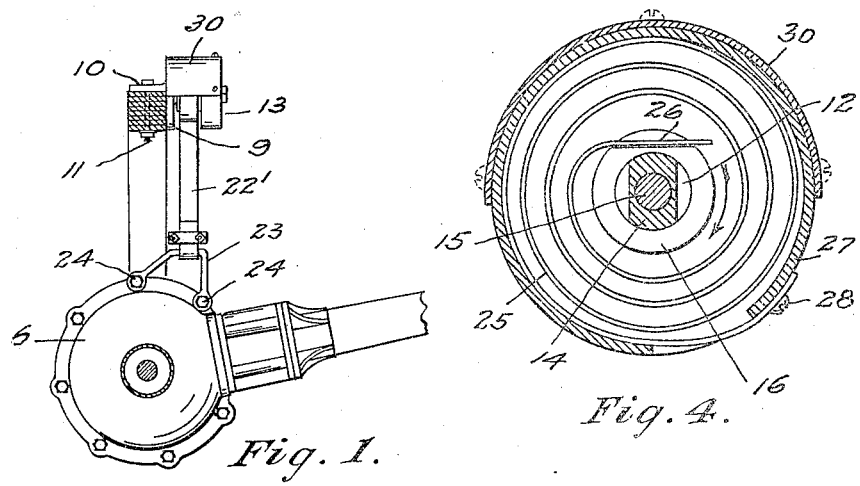
Fig. 1.
Fig. 4.
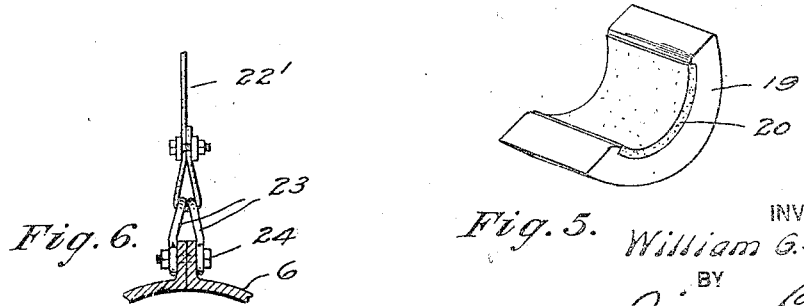
Fig. 6.
Fig. 5.
INVENTOR
William G. Struthers
BY
Pierre Barnes
ATTORNEY Patented Feb. 12, 1924.

1,483,693

UNITED STATES PATENT OFFICE.

WILLIAM G. STRUTHERS, OF SEATTLE, WASHINGTON.

SHOCK ABSORBER.

Application filed November 20, 1922. Serial No. 602,017.

*To all whom it may concern:*

Be it known that I, WILLIAM G. STRUTHERS, a citizen of the United States, residing at Seattle, in the county of King and State of Washington, have invented certain new and useful Improvements in Shock Absorbers, of which the following is a specification.

This invention relates to shock absorbers and snubbers for use on motor vehicles and is in the nature of improvements to the devices shown and described in my Patent Number 1,437,838, dated December 5, 1922.

The object of the present invention is to simplify and improve the efficiency of this type of devices.

The invention consists in the novel construction, arrangement and combination of parts hereinafter described and claimed.

In the accompanying drawing,—

Figure 1 is a longitudinal vertical section through the rear axle housing and a body-supporting spring of an automobile having applied thereto an embodiment of my invention, shown in side elevation. Fig. 2 is a view in longitudinal vertical section of the invention attached to the body-supporting spring, said section being taken substantially through broken line 2—2 of Fig. 3. Figs. 3 and 4 are transverse sectional views through 3—3 and 4—4 of Fig. 2. Fig. 5 is a perspective view of one of the jaw members shown in Figs. 2 and 3. Fig. 6 is a detail transverse sectional view through the rear axle housing and in rear elevation a portion of the snubber strap connection attached thereto.

In said drawing, for illustrative purposes the invention is shown applied to the spring 5 at or about the position of the latter's connection to the vehicle's frame or body, not shown, and to the axle housing 6 at the rear end of an automobile, although it is to be understood that the invention is intended to be used also in connection with a front axle.

In carrying out the invention I provide a body 7 comprising a horizontally disposed cylindrical portion 8, hereinafter designated as the drum extending axially from a disk element 9 provided with a bracket element 10 whereby said body is secured as by means of a bolt 11 to a support afforded by the spring 5.

The body 7 is also provided with an arbor element 12 disposed axially from the drum 8 and serves as a support for a cylindrical shell member 13 having in the end thereof a polygonal hole to receive a correspondingly shaped portion 14 of said arbor for connecting the shell member against rotation thereto. 15 represents a bolt engaging in a screw threaded hole in said arbor for coupling the shell therewith.

Mounted for rotation on the arbor 12 is a hub element 16 of a yoke 17 provided with parallel arm elements 18 disposed at opposite sides of the drum 8 and between the opposing ends of two concave jaw members 19 which seat upon the periphery of the drum.

The jaw members 19 are preferably bushed with respect to said drum by means of liners 20 of asbestos or other suitable material of high frictional characteristics. Secured as by means of screws 21 to one of the yoke arms 18 is the end of a flexible metal band 22 which constitutes an extension of a flexible strap 22¹ which, after being coiled about the yoke arms 18 and the jaw members 19, as shown in Figs. 2 and 3, is connected, as by links 23 and bolts 24, to the axle housing 6 as shown in Figs. 1 and 6.

25 represents a helical spring, see Fig. 4, surrounding the hub portion 16 of said yoke and has one of its ends secured to such hub as by engaging in a slot 26 thereof and its other end secured to the peripheral wall 27 of said shell as by means of a screw 28.

30 represents a cover or guard plate secured to the body flange 9 and the shell 13 for protecting the jaws, drum, etc., from dirt or dust.

The spring 25 serves through the medium of the yoke arms 18 which act circumferentially of the drum against an end of each of the jaws 19 to push the same in a substantially tangential direction from the drum, thereby permitting rotary motion to the latter to accommodate up-and-down movements of the vehicle body, subject to the action of the vehicle springs and with respect to the wheel axle and obviate slack in the strap 22¹.

When the vehicle wheels, however, encounter hummocks or other obstacles in the road, the resultant spring rebounding movements of the body exercises a powerful tensional force through the cable causing the coils of the latter to cause the jaws 19 to frictionally embrace the drum 8 to gradually absorb the shock. In the present invention the yoke regulates the relative circumferential spacing of the two jaw members 19 whereby the strains applied through the latter are distributed substantially about the entire circumference of the stub shaft.

A further advantage of the present invention is that the spring controlled yoke affords a rapid release of the jaws with respect to the shaft when the cable is not subjected to abnormal tension as under ordinary road conditions.

What I claim, is:—

1. In a shock absorber, the combination of a stationary drum, two opposed jaws revolubly mounted upon said drum, a rotatable yoke member having arm elements extending into the spaces between said jaws at diametrically opposite sides of the drum, a flexible member coiled about said jaws and having one of its ends connected to said yoke, and a spring connected to said yoke for rotating the same to retract said flexible member when tension thereon is relieved.

2. In a shock absorber, the combination of a stationary drum provided with a shaft extension, a pair of jaws mounted upon said drum, a yoke rotatably mounted upon said shaft extension and revolubly connected with both of said jaws, a flexible member wound about said jaws, and a spring connected to said yoke for rotating the same to retract said flexible member when the tension on the same is relieved.

3. In a shock absorber, the combination of a stationary drum, friction jaws revolubly mounted thereon, a rotatable yoke having arm elements interposed between said jaws, a flexible member connected to one of said arm elements and coiled about both of said arm elements and said jaws to cause the latter when pulled outwardly to grip the drum, and a spring operatively connecting said drum and the yoke whereby said yoke is rotated to retract said flexible member when the tension on the same is relieved.

4. In a shock absorber, the combination of a stationary drum having a shaft extending axially therefrom, jaws mounted upon said drum, a yoke rotatable upon said shaft and revolubly connected with said jaws, a flexible member connected to said yoke and coiled about said jaws, a shell rigidly secured to said shaft, and a coil spring having its ends connected to said shell and the yoke for revolving the jaws for retracting said flexible member when the tension thereon is relieved.

Signed at Seattle, Washington, this 3rd day of November, 1922.

WILLIAM G. STRUTHERS.

Witnesses:
PIERRE BARNES,
MARGARET G. SUPPLE.